No. 682,026. Patented Sept. 3, 1901.
R. BUNGEROTH.
WROUGHT METAL PIPE.
(Application filed May 11, 1901.)
(No Model.)
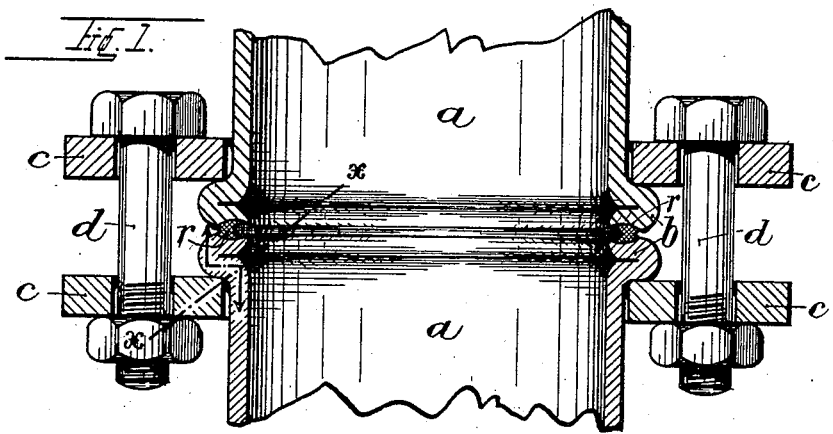
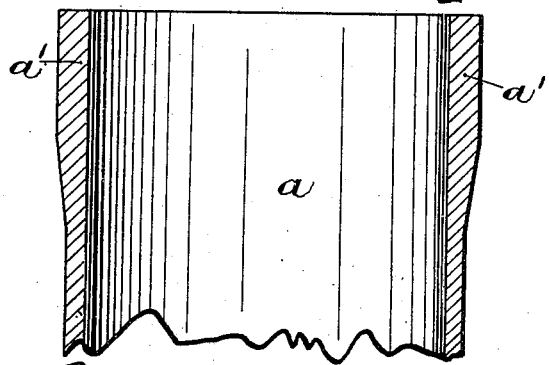
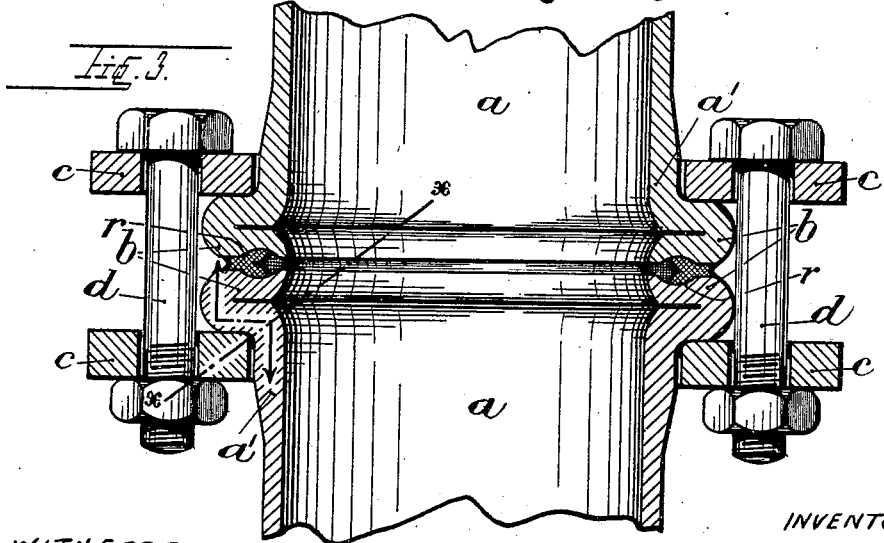
WITNESSES:
F. W. Wright.
S. C. Connor.
INVENTOR
RUDOLF BUNGEROTH
BY Howson and Howson
HIS ATTORNEYS.

UNITED STATES PATENT OFFICE.

RUDOLF BUNGEROTH, OF DUSSELDORF, GERMANY.

WROUGHT-METAL PIPE.

SPECIFICATION forming part of Letters Patent No. 682,026, dated September 3, 1901.

Application filed May 11, 1901. Serial No. 59,845. (No model.)

*To all whom it may concern:*

Be it known that I, RUDOLF BUNGEROTH, a subject of the German Emperor, residing in Dusseldorf, Germany, (whose post-office address is Adersstrasse 36, in said Dusseldorf, Germany,) have invented Improvements in Wrought-Metal Pipes, of which the following is a specification.

My invention relates to that class of wrought-metal pipes or tubing in which rims, shoulders, or flanges are formed at the ends of the pipes by doubling the metal on itself, such rims serving with packing and suitable fastening means to form joints with adjacent pipes.

The object of my invention is to so construct a pipe or tube of this character that it will not break or give way at or near the rim, as has been often the case.

In the accompanying drawings, Figure 1 is a sectional view of such pipe ends as ordinarily formed and combined with joining means. Fig. 2 is a sectional view of a pipe end prepared for the formation of a rim or flange according to my invention, and Fig. 3 is a sectional view of two flanged pipe ends according to my invention and joined together by means similar to those shown in Fig. 1.

In Fig. 1 the end of each wrought-metal pipe $a$ is doubled, as at $b$, to form a rim or flange, and an annular groove $r$ is formed in the face of the flange for the reception of the packing, and rings $c\ c$ are put on the pipes behind the flanges $b$, and bolts and nuts $d$ applied to draw the adjacent ends of the pipes together to make a tight joint. It has been found that such doubled flanges are liable to break or give way or even tear off under strain, particularly on the line $x\ x$, the point of transition from the cross-section of the pipe to the cross-section of the rim or flange, and this is because the cross-section at the point $x\ x$ is subjected to disproportionate and opposing strains in the directions of the arrows. These strains may be produced by unequal tightening of the bolts $d$ or by "jarring" of the fluids in the pipes, where high pressures are used, or by expansion and contraction under changes of temperatures. To prevent this trouble, I make the pipe ends in the manner indicated in Figs. 2 and 3. As shown in Fig. 2, I thicken the end of the pipe outwardly at $a'$ by upsetting, for instance, the length of this thickened part being sufficient to enable the required doubled rim $b'$ to be formed and yet to bring the thickened part at the point $x\ x$, where the cross-section of the pipe passes into the cross-section of the doubled rim. In this way I can make this normally weak point $x\ x$ so strong that the pipe will tear at its normal cross-section sooner than at the point $x\ x$.

I claim as my invention—

1. A wrought-metal pipe having a thickened end on which is formed a doubled flanged rim, as and for the purpose described.

2. A wrought-metal pipe having its end thickened outwardly and a doubled flanged rim formed thereon, as and for the purposes described.

In testimony whereof I have signed my name to this specification in the presence of two subscribing witnesses.

RUDOLF BÜNGEROTH.

Witnesses:
 P. LIEBER,
 WILLIAM ESSENWEIN.